(12) United States Patent
Hall

(10) Patent No.: US 11,364,552 B2
(45) Date of Patent: Jun. 21, 2022

(54) HINGE JIG

(71) Applicant: Taylor James Hall, Palatine, IL (US)

(72) Inventor: Taylor James Hall, Palatine, IL (US)

(73) Assignee: Nomis LLC, Palatine, IL (US)

( * ) Notice: Subject to any disclaimer, the term of this patent is extended or adjusted under 35 U.S.C. 154(b) by 44 days.

(21) Appl. No.: 16/908,275

(22) Filed: Jun. 22, 2020

(65) Prior Publication Data

US 2021/0394279 A1 Dec. 23, 2021

(51) Int. Cl.
*B23B 47/28* (2006.01)
*B23B 49/02* (2006.01)

(52) U.S. Cl.
CPC .......... *B23B 47/287* (2013.01); *B23B 49/023* (2013.01)

(58) Field of Classification Search
CPC ....... B23B 47/287; B23B 47/28; B23B 49/02; B23B 49/023; B23B 49/005; B23B 2247/00; Y10T 408/567; Y10T 408/568
See application file for complete search history.

(56) References Cited

U.S. PATENT DOCUMENTS

| | | | | |
|---|---|---|---|---|
| 2,861,484 A | * | 11/1958 | Rance | B23B 49/026 408/115 R |
| 3,049,031 A | * | 8/1962 | Carstens | B23B 49/026 408/76 |
| 3,108,500 A | * | 10/1963 | Merriman | B23B 49/023 408/241 R |
| 4,474,514 A | * | 10/1984 | Jensen | B23B 47/287 408/115 B |
| 5,076,742 A | * | 12/1991 | Lee | B23B 47/287 408/112 |
| 5,580,195 A | * | 12/1996 | Kelly | B23B 41/12 408/1 R |
| 6,077,001 A | * | 6/2000 | Fetzer | B23B 47/28 408/115 R |

OTHER PUBLICATIONS https://www.kregtool.com/shop/hardware-installation/cabinet-shelf-jigs/concealed-hinge-jig/KHI-HINGE.html—Concealed Hinge Jig. Known prior to Jun. 22, 2020.
https://www.amazon.com/Drilling-Forstner-Woodworking-Cabinet-Installation/dp/B075WV4TXN—35mm Hinge Drilling Jig + 35mm Forstner Bit Woodworking Tool Drill Bits for Cabinet Door Installation. Known prior to Jun. 22, 2020.
https://www.amazon.com/Concealed-Suitable-Cabinet-Cupboard-Installation/dp/B087YRPV8T/ref=sr_1_5?dchild=1&keywords=concealed+hinge+jig&qid=1600808963&s=hi&sr=1-5 TOKTOO 3 5mm Concealed Hinge Jig; Tulead Puncher Device 35mm/26mm Hinged Drill Bits Door Opener Closet Door Hole Jig Puncher Hinge Drilling Tool Set; 35mm Hinge Drilling Jig Hole Drill Guide Concealed Hinge Drilling Jig Woodworking Tool for Cabinet Door Installation. Known prior to Jun. 22, 2020.

* cited by examiner

*Primary Examiner* — Eric A. Gates
*Assistant Examiner* — Paul M Janeski
(74) *Attorney, Agent, or Firm* — Reinhart Boerner Van Deuren P.C.

(57) ABSTRACT

Jigs for forming holes for mounting a hinge to a door or frame is provided. The jig includes a main body defining a drilling aperture extending therethrough. The drilling aperture may be bounded by a tapered sidewall. The jig may include alignment cams that include knobs that allow for adjusting the position of the jig relative to the door. A cabinet hole template may be provided. The jig may provide structure for quickly locating a depth stop relative to a drill bit. The jig may include drill bit guides for forming holes for fasteners relative to a main cup hole that may be formed using the jig.

9 Claims, 10 Drawing Sheets

HINGE JIG

FIELD OF THE INVENTION

This invention generally relates to jigs for attaching concealed hinges to a cabinet door and/or to a cabinet frame.

BACKGROUND OF THE INVENTION

Cabinet doors often use concealed hinges to attach the doors to the cabinet frame. The concealed hinge typically includes a first portion that is attached to the cabinet door that is hingedly attached to a second portion that is attached to the cabinet frame. The portion that is attached to the cabinet door is often located within a cup formed in an inner face of the cabinet door so as to recess that portion of the hinge.

Also, fasteners, typically screws, are used to secure the first portion of the hinge to the cabinet door. Fasteners, typically screws, are used to secure the second portion of the hinge to the cabinet frame.

It is important that the cup and holes that receive the fasteners are all properly located in the corresponding components of the cabinet (e.g. cabinet door or cabinet frame) so that the cabinet door is properly oriented relative to the cabinet frame as well as any other doors or drawers that may be provided by the cabinet.

The present invention provides an improvement over the art in how to form the cup in the cabinet door as well as the holes for receiving the fasteners to secure the first and second portions of the hinge to the components of the cabinet.

BRIEF SUMMARY OF THE INVENTION

A new and improved jig for drilling holes for mounting a hinge to a cabinet door and/or cabinet frame is provided.

In an embodiment, a jig for drilling a cup hole in a cabinet door for receipt of a hinge is provided. The jig includes a main body and a central drill bit guide. The main body has a top surface, a bottom surface, and a drilling aperture extending therethrough. The drilling aperture is bounded by a sidewall extending between the top and bottom surfaces. The sidewall extends at a non-perpendicular angle relative to the top and bottom surfaces such that the drilling aperture is larger at the top surface than at the bottom surface. The central drill bit guide is positioned over the drilling aperture. The central drill bit guide has a drill bit hole for receiving and guiding a shank of a drill bit.

In one embodiment, the jig includes a pair of alignment cams. Each alignment cam of the pair of alignment cams is rotatably mounted to the main body for rotation about a central axis. Each alignment cam has a plurality of cam regions having different radial spacings from the central axis to adjust the position of the drilling aperture from a side of the cabinet door when the different cam regions abut an edge of the cabinet door.

In one embodiment, the central drill bit guide is removably attached to the main body.

In one embodiment, the sidewall extends at an angle of between 1 degree and 10 degrees relative to perpendicular to the top and bottom surfaces.

In one embodiment, a jig for drilling a cup hole in a cabinet door for receipt of a hinge is provided. The jig includes a main body, a first drill bit guide, a second drill bit guide, and a central drill bit guide. The main body has a top surface, a bottom surface, and a drilling aperture extending therethrough. The main body is formed of a first material. The first drill bit guide is offset from the drilling aperture. The first drill bit guide has a first plurality of holes extending therethrough at different positions relative to the drilling aperture. The first plurality of holes defines a first pattern. The second drill bit guide is offset from the drilling aperture. The second drill bit guide has a second plurality of holes extending therethrough at different positions relative to the drilling aperture. The second plurality of holes defines a second pattern. The second pattern being a mirror image of the first pattern. The central drill bit guide is removably attachable to the main body over the drilling aperture. The central drill bit guide has a drill bit hole for receiving and guiding a shank of a drill bit.

In one embodiment, the jig includes a pair of alignment cams. Each alignment cam of the pair of alignment cams is rotatably mounted to the main body for rotation about a central axis. Each alignment cam has a plurality of cam regions having different radial spacings from the central axis to adjust the position of the drilling aperture from a side of the cabinet door when the different cam regions abut an edge of the cabinet door.

In one embodiment, the main body is formed from a first material and the first and second drill bit guides are formed from a second material. The second material is harder than the first material.

In one embodiment, the main body is a molded plastic and the first and second drill bit guides are metal. The main body is molded around the first and second drill bit guides to secure the first and second drill bit guides to the main body.

In an embodiment, a jig for drilling a cup hole in a cabinet door for receipt of a hinge is provided. The jig includes a main body, a central drill bit guide, and a pair of alignment cams. The main body has a top surface, a bottom surface, and a drilling aperture extending therethrough. The central drill bit guide extends over the drilling aperture. The central drill bit guide has a drill bit hole for receiving and guiding a shank of a drill bit. Each alignment cam of the pair of alignment cams is rotatably mounted to the main body for rotation about a central axis. Each alignment cam has a plurality of cam regions having different radial spacings from the central axis to adjust the position of the drilling aperture from a side of the cabinet door when the different cam regions abut an edge of the cabinet door. Each alignment cam includes a knob extending upward beyond the top surface and is sized to be grasped by a user to rotate the alignment cam about the central axis.

In one embodiment, the alignment cams are able to be rotated relative to the main body without the use of tools.

In one embodiment, the knobs are sized to be gripped by a thumb and an index finger of a user.

In one embodiment, the alignment cams may have indexing features for allowing for quick acknowledgement of the appropriate orientation of the alignment cams relative to the main body.

In an embodiment, a jig for drilling a cup hole in a cabinet door to be mounted to a cabinet frame with a hinge is provided. The jig includes a main body, a central drill bit guide, a pair of alignment cams, and a cabinet hole template. The main body has a top surface, a bottom surface, and a drilling aperture extending therethrough. The drilling aperture is bounded by a sidewall extending between the top and bottom surfaces. The central drill bit guide is removably attachable to the main body over the drilling aperture. The central drill bit guide has a drill bit hole for receiving and guiding a shank of a drill bit. Each alignment cam of the pair of alignment cams is rotatably mounted to the main body for rotation about a central axis. Each alignment cam has a plurality of cam regions having different radial spacings from the central axis to adjust the position of the drilling aperture from a side of the cabinet door when the different cam regions abut an edge of the cabinet door. The cabinet hole template has a first portion and a second portion extending perpendicular to the first portion. The cabinet hole template has at least a first pair of holes formed therethrough for forming holes in the cabinet frame. The cabinet hole template and the main body have a snap engagement interface for releasably securing the cabinet hole template to the main body.

In one embodiment, the snap engagement interface includes an aperture formed by one of the main body and the cabinet hole template and a resilient post sized larger than the aperture. The resilient post being formed by the other one of the main body and the cabinet hole template.

In one embodiment, the cabinet hole template includes a second pair of holes. The first pair of holes is formed in the first portion and the second pair of holes is formed in the second portion.

In one embodiment, each hole of the first pair of holes is spaced a same first distance from the second portion and each hole of the second pair of holes is spaced a same second distance from the first portion. The second distance is different than the first distance.

In one embodiment, the cabinet hole template includes a third pair of holes. The third pair of holes is formed in the second portion. Each hole of the third pair of holes is spaced the same second distance from the first portion. The second pair of holes is spaced a third distance from one another. The third pair of holes is spaced a fourth distance from one another. The third and fourth distances are different.

In one embodiment, the cabinet hole template includes a fourth pair of holes. The fourth pair of holes is formed in the first portion. Each hole of the fourth pair of holes is spaced a fifth distance from the second portion. The fifth distance is greater than the first distance. The holes of the first pair of holes are spaced a sixth distance from one another. The holes of the fourth pair of holes are spaced the sixth distance from one another.

In an embodiment, a jig for drilling a cup hole in a cabinet door includes a main body, a central drill bit guide, a drill bit, and a stop collar (also referred to as a depth collar). The main body has a top surface, a bottom surface, and a drilling aperture extending therethrough. The drilling aperture is bounded by a sidewall extending between the top and bottom surfaces. The central drill bit guide is, optionally, removably attachable to the main body over the drilling aperture. The central drill bit guide has a drill bit hole for receiving and guiding a shank of a drill bit. A drill bit having a shaft slidably and rotatably mountable within the drill bit hole is provided. A stop collar adjustably attachable along the shaft of the drill bit is provided. A first stop collar alignment channel is formed in the main body having a first portion sized to receive an end portion of the shaft and a second portion sized to receive the stop collar to position the stop collar at a first position along the shaft from an end of the shaft defined by the end portion. A second stop collar alignment channel formed in the main body having a first portion sized to receive an end portion of the shaft and a second portion sized to receive the stop collar to position the stop collar at a second position along the shaft from the end of the shaft.

In one embodiment, the first stop collar alignment channel includes a first abutment against which the end of the shaft abuts when the stop collar is attached thereto. The second portion of the first stop collar alignment channel is spaced the first distance from the first abutment. The second stop collar alignment channel includes a second abutment against which the end of the shaft abuts when the stop collar is attached thereto. The second portion of the second stop collar alignment channel is spaced the second distance from the second abutment.

In one embodiment, the first portion of the first and second stop collar alignment channels has a curved bottom that has a first radius of curvature. The second portion of the first and second stop collar alignment channel has a second radius of curvature that is greater than the first radius of curvature. The first portions are radially offset from the second portions to form a radial step between the first portions and the second portions. The steps form an abutment for locating the stop collar relative to the first and second abutments.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
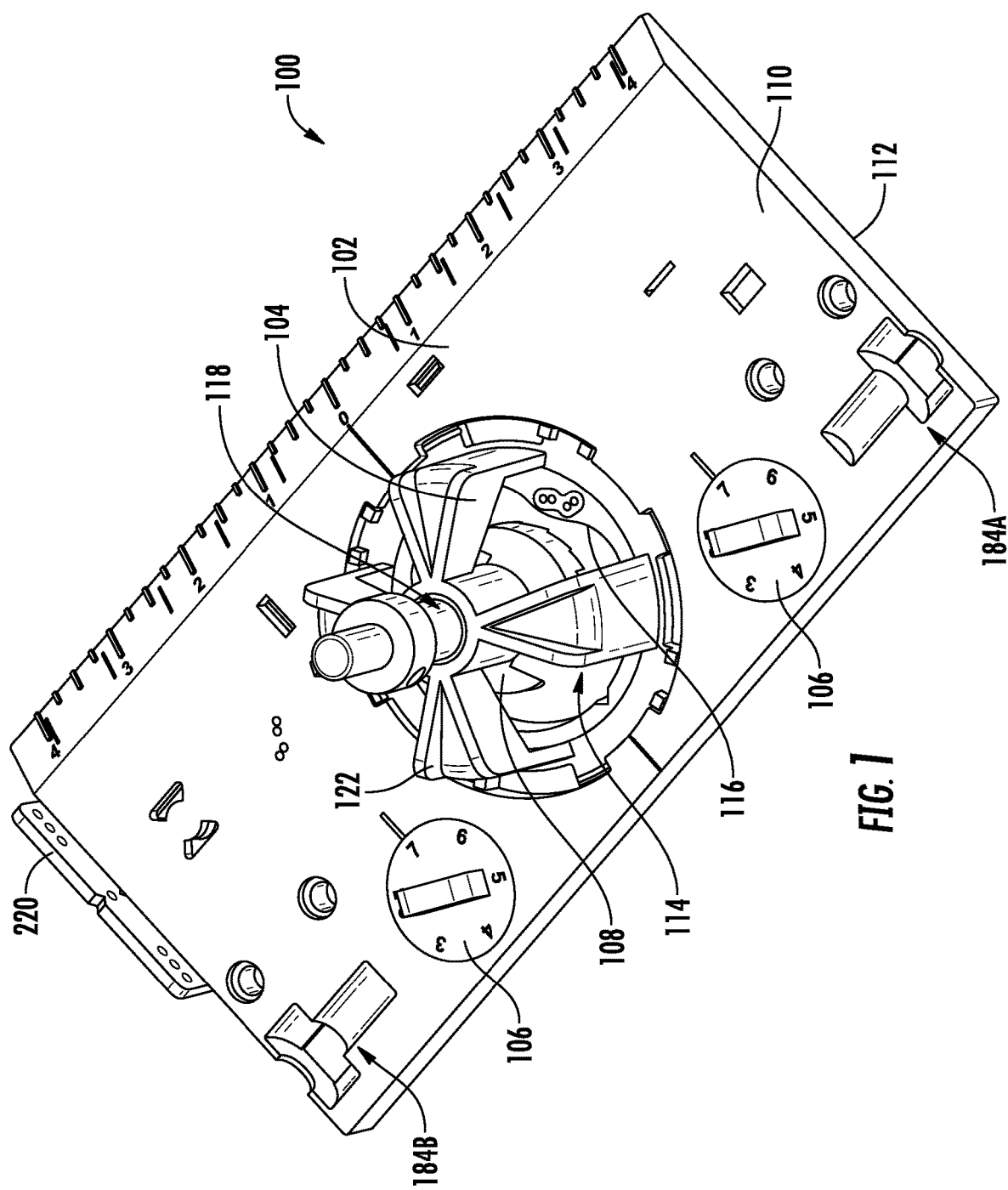
FIG. 1 is a top perspective illustration of a jig for locating necessary holes or cups for securing concealed hinges to a cabinet door and/or a cabinet frame.

FIG. 1 illustrates a jig 100 for forming cups or pockets within a door 160 (see FIG. of a cabinet for use with concealed hinges (also referred to as "European Style" hinges). The jig 100 can also be used to form/locate screw holes within the cabinet door for securing the concealed hinge within the cup and to the cabinet door.

The jig 100 includes a main body 102, a central drill bit guide 104, a pair of alignment cams 106, and a drill bit 108.

The main body 102 can be formed from metal or plastic.

Figure 2:
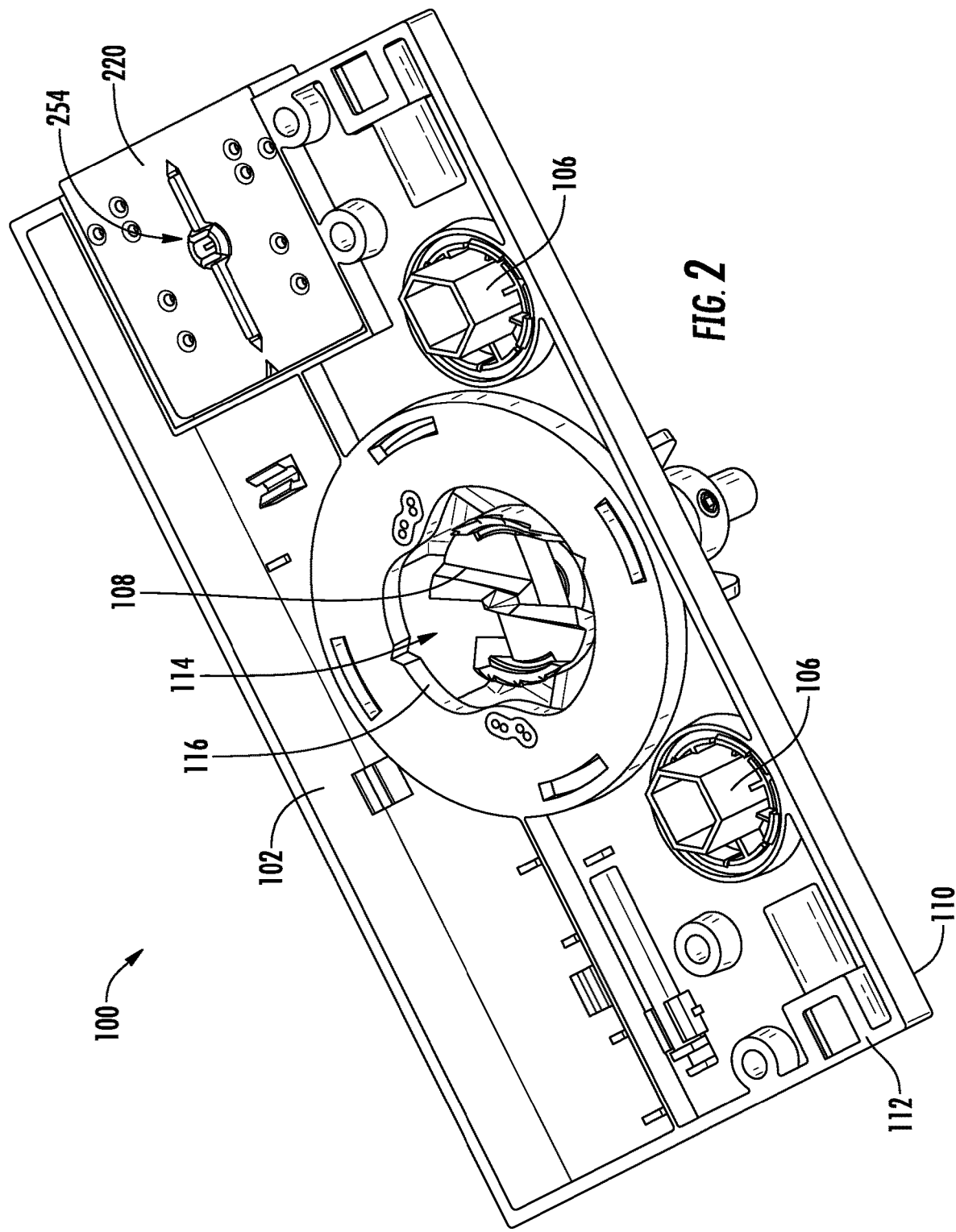
FIG. 2 is a bottom perspective illustration of the jig of FIG. 1.

The main body 102 includes a top surface 110 and a bottom surface 112 (see also FIG. 2).

A drilling aperture 114 extends through the top surface 110 and bottom surface 112. The drilling aperture 114 is bounded by a sidewall 116 that extends between the top surface 110 and bottom surface 112.

Figure 3:
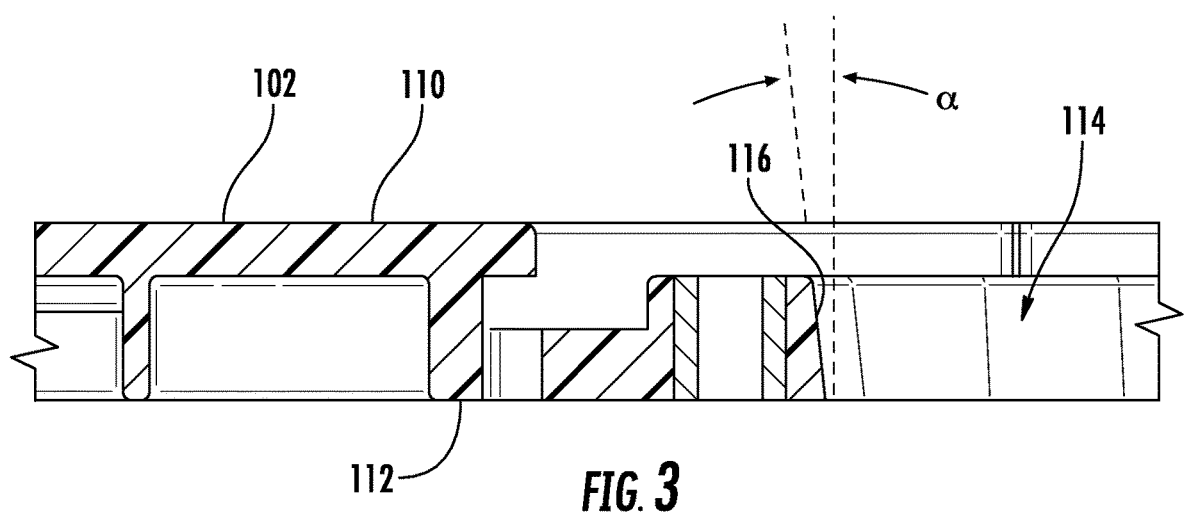
FIG. 3 is a partial cross-sectional illustration of the jig of FIG. 1 with a central drill guide and drill bit removed.

In a preferred embodiment, the sidewall 116 is angled at a non-perpendicular, non-parallel orientation relative to the top and bottom surfaces 110, 112. In FIG. 3, the sidewall 116 has an angle $\alpha$ relative to the central axis through the drilling aperture 114. Angle $\alpha$ is measured from being normal to top and bottom surfaces 110, 112. Angle $\alpha$ may be between 1 and 25 degrees, more preferably between 5 and 15 degrees. The sidewall 116 is angled such that the drilling aperture 114 is larger at the top surface 110 than at the bottom surface 112. This angled sidewall 116 arrangement, while not required in all embodiments, is helpful in chip evacuation during drilling of the cups within the inner side of the cabinet doors. The tapered sidewall 116 helps the chips formed by drill bit 108 to flow out of the drilling aperture 114.

Figure 4:
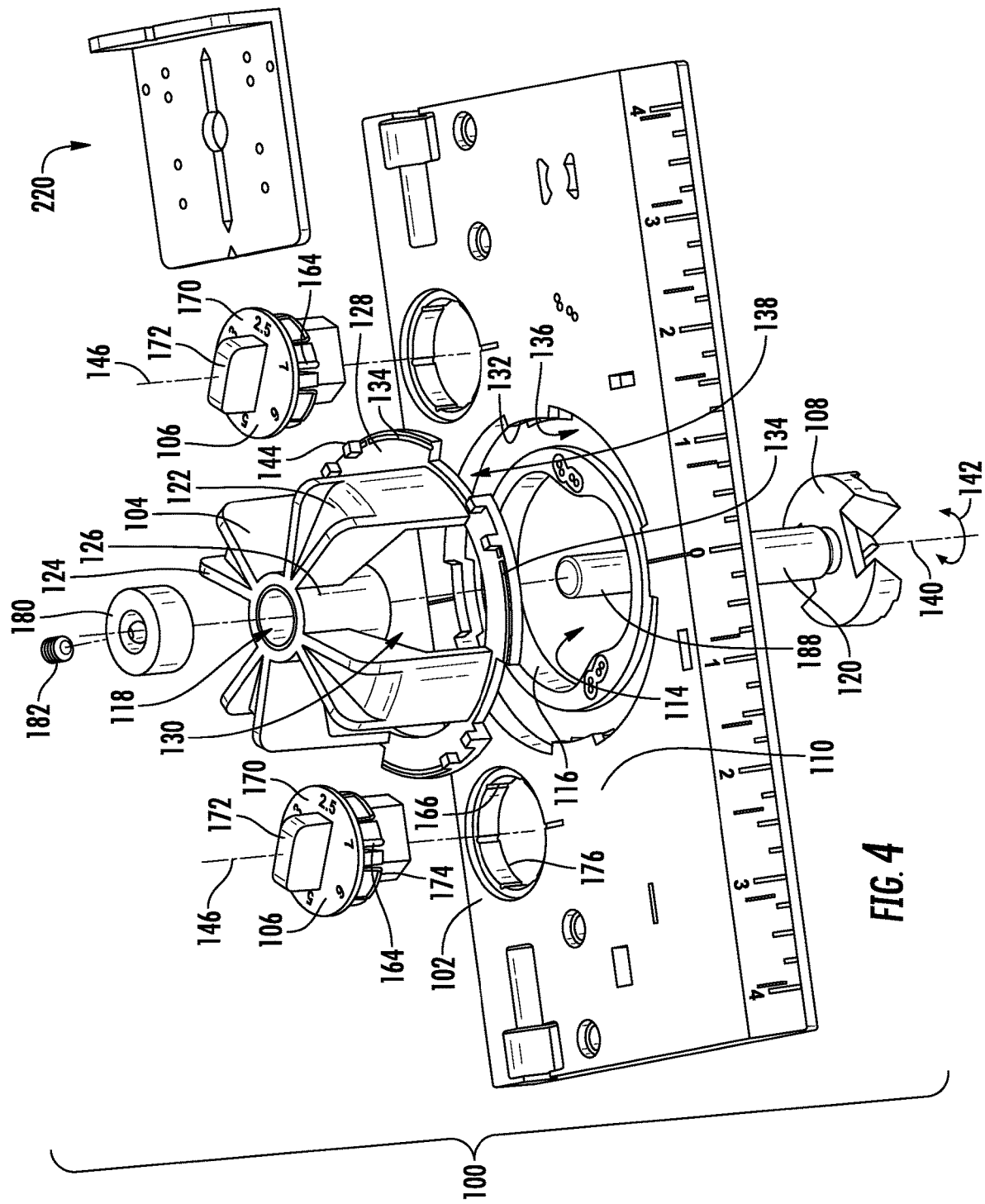
FIG. 4 is an exploded perspective illustration of the jig of FIG. 1.

In the illustrated embodiment and with additional reference to FIG. 4, the central drill bit guide 104 is removably mounted to the main body 102 over the drilling aperture 114. The central drill bit guide 104 has a drill bit hole 118 that receives and guides a shank 120 of the drill bit 108.

In some embodiments, the central drill bit guide 104 has a plastic body 122 that has a plurality of legs 124 that connect to a central hub 126 that defines the drill bit hole 118 at a radially inner end an outer ring 128 connected to radially outer ends of the legs 124. The legs 124 are angularly spaced apart forming gaps 130 angularly therebetween that further allow for chip extraction of chips of material being removed from the cabinet doors for forming the cups.

In this embodiment, the central hub 126 may include an annular metal insert that forms the drill bit hole 118 to reduce wear and maintain accuracy of the central drill bit guide 104. In some embodiments, the plastic body 122 may be molded around the annular metal insert.

In this embodiment, the central drill bit guide 104 is removable from the main body 102. In other embodiments, the central drill bit guide 104 could be a permanent component with the main body.

To removably attach the central drill bit guide 104 to the main body 102, a twist lock interface is provided by the main body and the central drill bit guide 104. The twist lock interface in this embodiment is provided by a plurality of radially inward extending tabs 132 provided by the main body 102 and a plurality of radially outward extending tabs 134 that axially engage to secure the two components to one another.

When attaching the central drill bit guide 104, tabs 134 pass through slots 136 formed between adjacent ones of tabs 132 while tabs 132 pass through slots 138 formed between adjacent ones of tabs 134. Once the tabs 132, 134 axially pass one another, the central drill bit guide 104 can be angularly rotated about central axis 140 (see arrow 142) to angularly align tabs 132, 134 and prevent axial removal of the central drill bit guide 104 from the main body 102. Abutment tabs 144 are provided to abut tabs 132 to indicate when the central drill bit guide 104 is properly rotated and in its fully seated position.

Engaging projections and notches/recesses may be provided between the central drill bit guide 104 and the main body 102 to provide tactile feel to the user to know that the components are properly engaged (e.g. angularly).

In the illustrated embodiment, the drill bit 108 is a forstners bit.

Alignment cams 106 are rotatably mounted to main body 102 for rotation about axes 146. The alignment cams 106 abut an edge of a workpiece to properly offset the drill bit 108 from the edge of the workpiece to properly locate the cups that are formed in the cabinet door.

Figure 6:
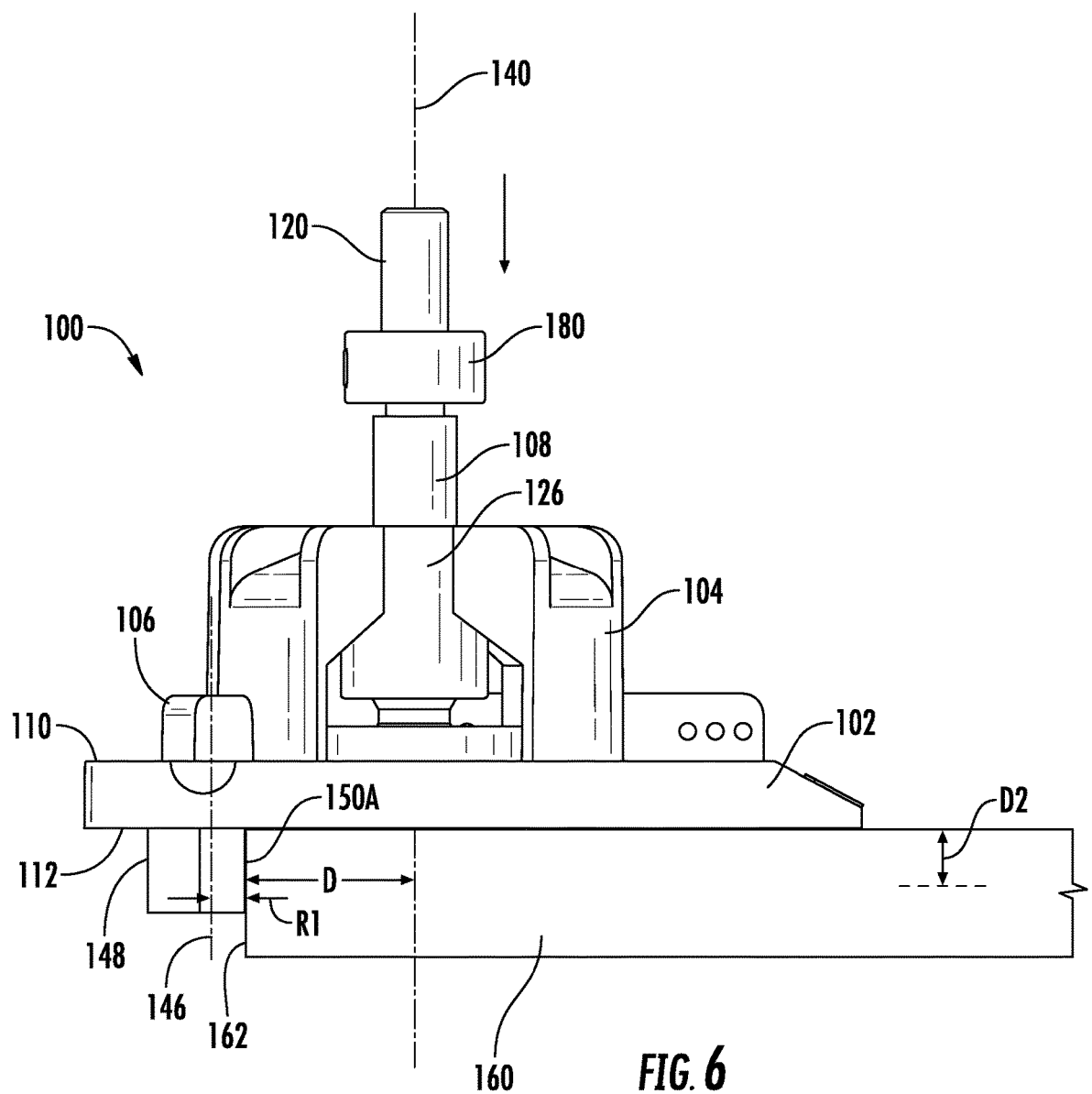
FIG. 6 is a side view of the jig being located relative to a cabinet door for forming a cup in a face of the cabinet door.
Figure 7:
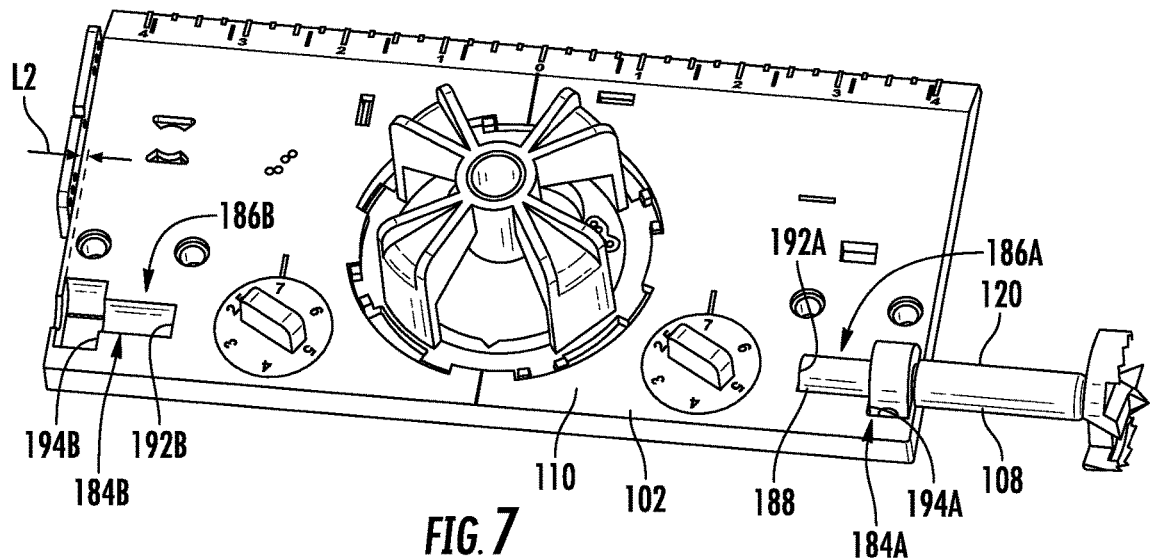
FIGS. 7 and 8 illustrate the jig being used to locate a depth collar along a shank of the drill bit of the jig for drilling cups of different depths.
Figure 8:
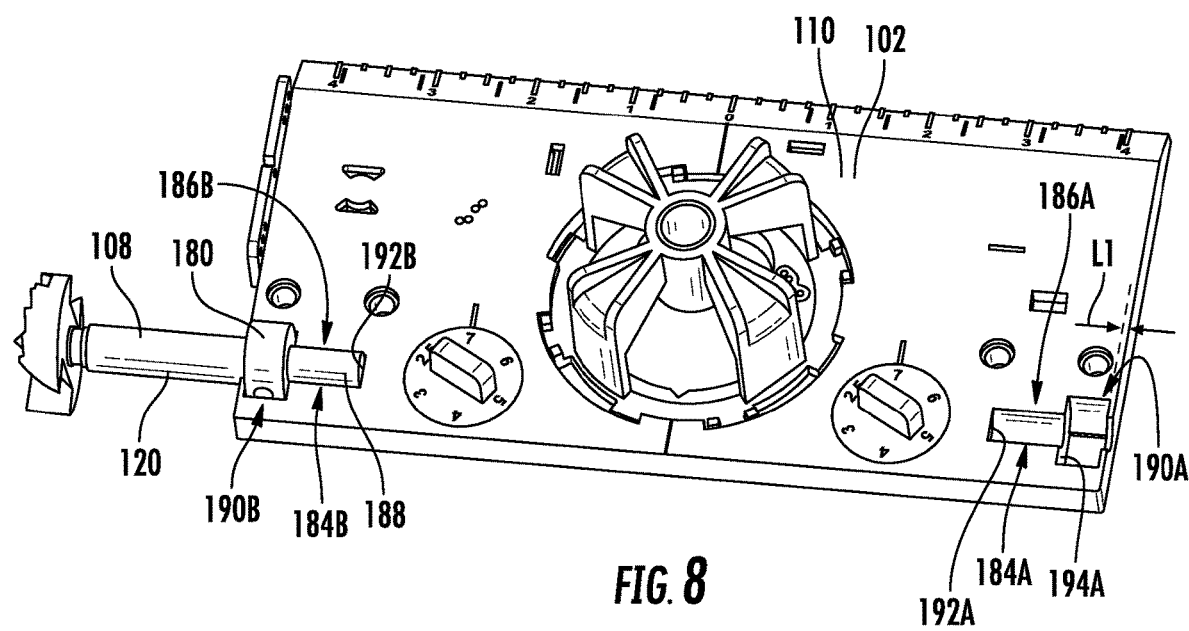
Figure 9:
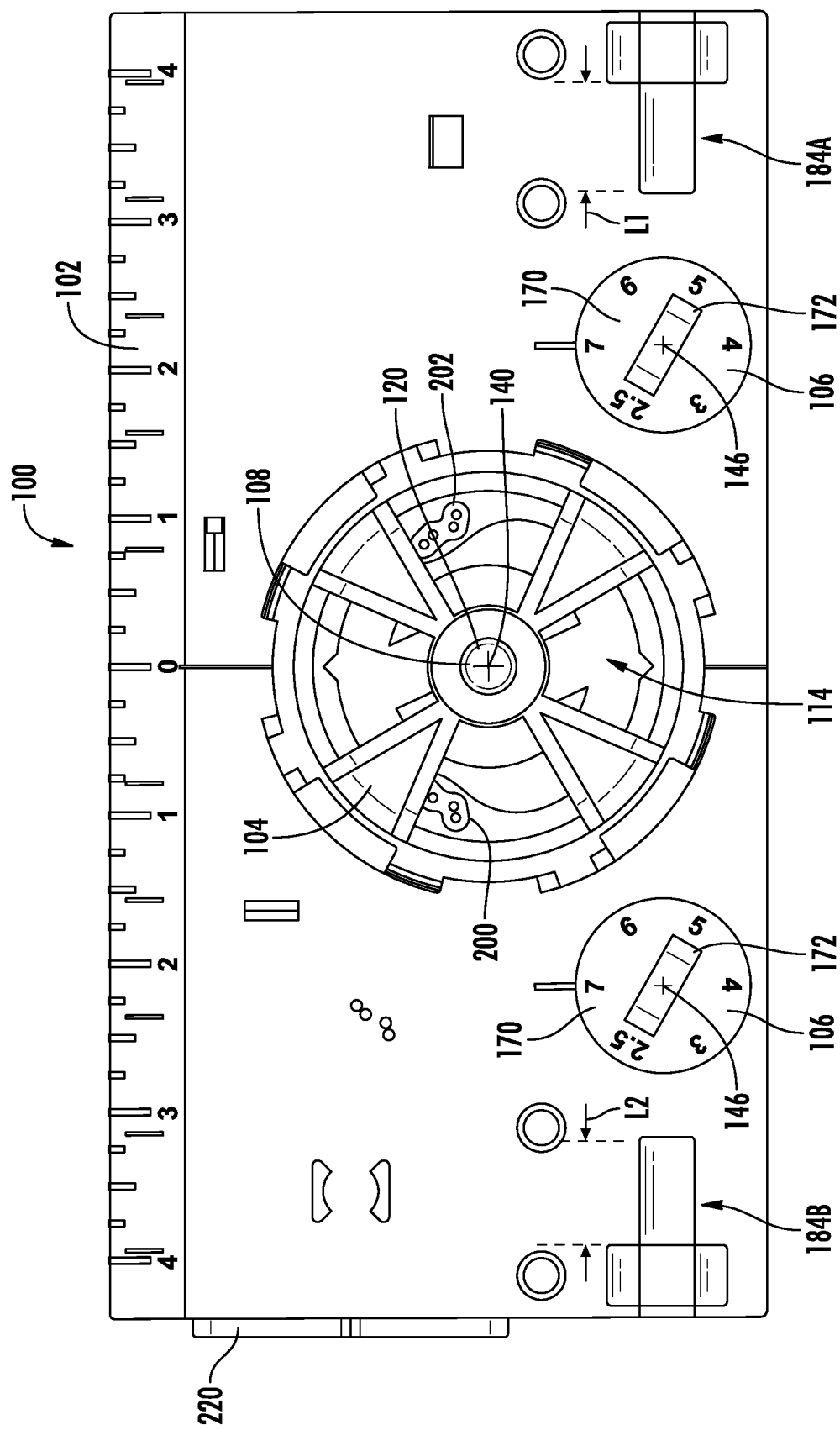
FIG. 9 is a top view of the jig of FIG. 1.
Figure 10:
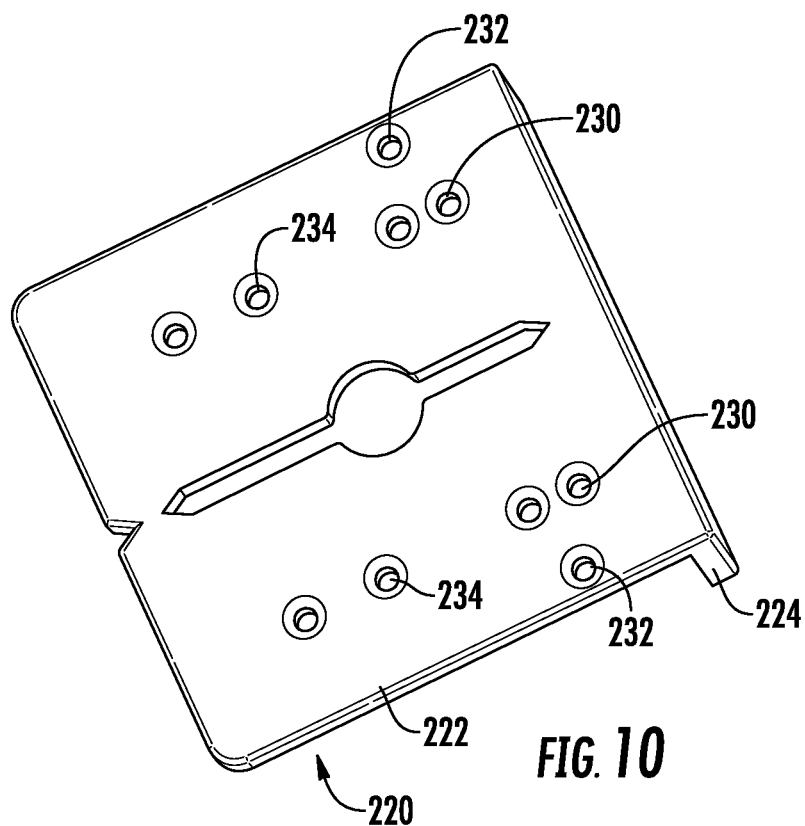
FIGS. 10-14 are illustrates of a cabinet template removed from the main body of the jig of FIG. 1.
Figure 11:
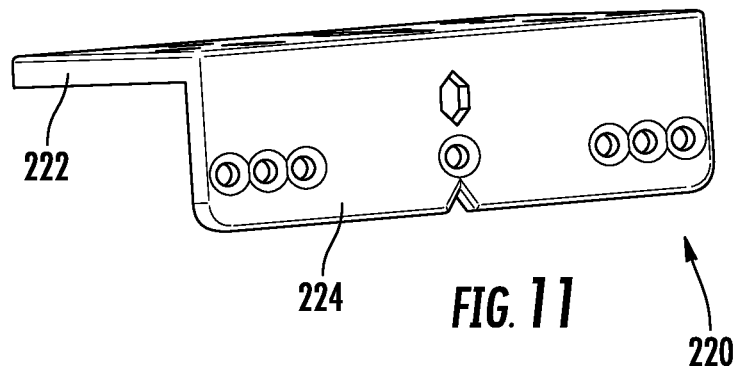
Figure 12:
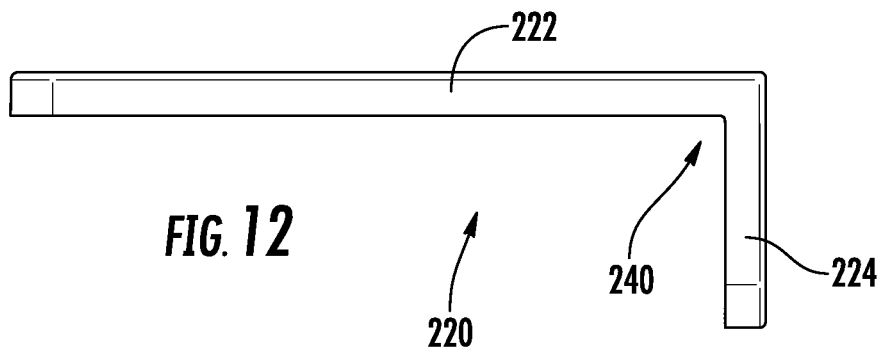
Figure 13:
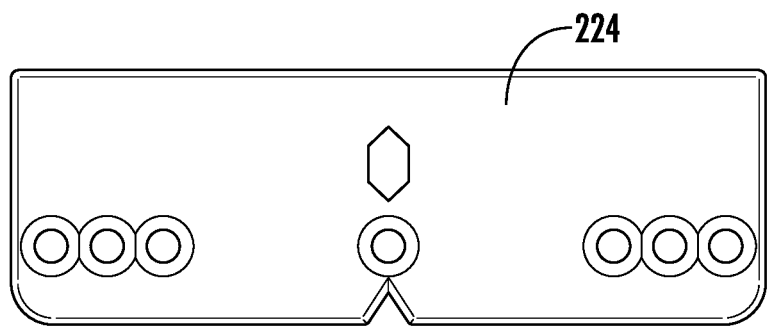
Figure 14:
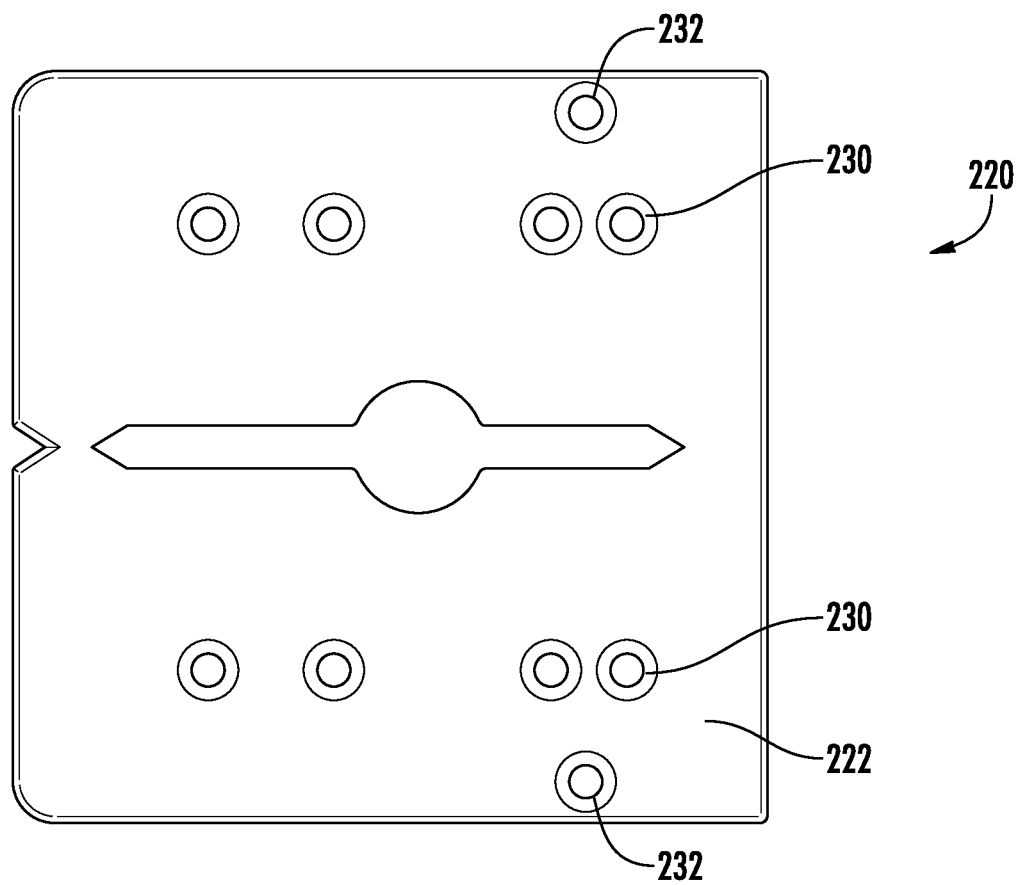

The outer periphery 148 of a bottom portion of the alignment cams 106 has a plurality of cam regions. Each cam region 150A-150F has a different radial spacing R1-R6 from central axis 146. By providing the cam regions 150A-150F with different radial spacings R1-R6 from axes 146, the drill bit 108 can be located different distances D (see FIG. 6) from the edge of the cabinet door to form the cups at different offsets from the edge of the cabinet door. In use, the user would align the desired cam regions 150A-150F off the pair of alignment cams 106 such that they form an abutment plane facing towards drill bit 108 and then abut the cam region 150A-150F against the edge 162 of the cabinet door to align the jig 100 relative to the cabinet door.

With reference to FIG. 4, each alignment cam 106 and the main body 102 has an alignment interface therebetween so as to easily align the pair of alignment cams 106 relative to the main body 102, and particularly the desired cam regions 150A-150F thereof for the desired offset.

The alignment interfaces in this embodiment are provided by a plurality of projections and grooves. The projections 164 are attached to resilient fingers and resiliently engage grooves 166 for easy alignment of the alignment cams 106. While projections 164 are illustrated as being attached to the alignment cams 106 and the grooves 166 are formed in the main body 102, this configuration could be reversed.

The alignment cams 106 include a body portion 170 and a knob portion 172. A top of the body portion 170 is generally flush with the top surface 110 of the main body 102, while the knob portion 172 projects upward beyond top surface 110. The knob portion 172 is sized to be grasped by a user to rotate the alignment cams 106 without the need of a tool. Typically, the knob portion 172 is sized to be gripped between a thumb and index finger of a user sufficiently to provide sufficient torque to overcome the alignment interface between the alignment cam 106 and main body 102.

The alignment cams 106 include attachment features in the form or radially outward extending projections 174 that engage a bottom edge 176 of the main body 102 to secure the alignment cams 106 to the main body 102. The attachment features resiliently flex to allow for installation of the alignment cams 106.

It may be desired to adjust the depth D2 of the cups that are formed into the cabinet door 160. To do this, the user can adjust a position of a stop collar 180 along axis 140 (see FIG. 6). The stop collar 180 is slidable along the shank 120 and may be fixed at a desired location along shank 120 by a screw, such as set screw 182.

To do this, the main body 102 is provided with stop collar alignment channels 184A, 184B. The stop collar alignment channels 184A, 184B are formed in the top surface of the main body 110, but could be formed in other surfaces, such as the bottom surface 112.

Each stop collar alignment channel 184A, 184B, includes a first portion 186A, 186B sized to receive an end portion 188 of the shank 120. Each stop collar alignment channel 184A, 184B includes a second portion 190A, 190B, sized to receive the stop collar 180. Dimensions L1, L2 of the sidewalls that form one of the ends of the second portions 190A, 190B are different to adjust the location of the stop collar 180 along the shank 120. The dimensions L1, L2 provide different spacing between the stop collar 180 and shank 120. This will adjust the drilling depth of the drill bit 108. A third drilling depth can occur when the stop collar is directly pressed against shank 120. It is noted that the user can make further depth adjustments by further adjustments of the stop collar along the drill bit. However, these three locations are readily repeatable without having to use any measuring.

The first portions 186A, 186B have generally curved profiles that have a dimension that is smaller than a generally curved profile of the second portions 190A, 190B. The first portions 186A, 186B are generally vertically offset from their corresponding second portions 190A, 190B. This relationship creates a step between the first and second portions 186A/190A; 186B/190B. This step forms second abutments 194A, 194B.

When the first and second portions 186A, 186B, 190A, 190B are curved or have curved bottom portions, these dimensions may be in the form of a radius of curvature. However, curved portions are not required.

In addition to assisting in forming the cups for recessing the hinges, the jig 100 may be used to locate mounting holes for securing the hinges to the cabinet door 160. More particularly, the jig 100 includes first and second drill bit guides 200, 202 (see FIG. 5). Each drill bit guide 200, 202 includes a plurality of holes extending therethrough at different positions relative to the drilling aperture 114, e.g. relative to the central axis about which the drill bit 108 will rotate when forming the cups. The plurality of apertures in the first drill bit guide 200 forms a first pattern and the plurality of apertures in the second drill bit guide 202 forms a second pattern. In this embodiment, the first and second patterns are mirror images of one another. Typically, each hole in the first drill bit guide 200 will have a corresponding similarly spaced and oriented hole as the second drill bit guide 202, albeit on an opposed side of the drilling aperture 114 such that pairs of holes are formed, one hole of the pair of holes is from each of the first and second drill bit guides 200, 202.

The apertures in the first and second drill bit guide 200 will typically all be the same diameter, but could be different diameters. Typically, these holes will be significantly smaller in diameter than the hole through which drill bit 108 extends in the central drill bit guide 108.

Preferably, the first and second drill bit guides 200, 202 are formed as one or more separate components from the main body 102. In a preferred embodiment, the first and second drill bit guides 200, 202 are formed from a more wear resistant material than the main body 102. For example the first and second drill bit guides 200, 202 could be formed from a harder material than the main body 102. In one implementation, the first and second drill bit guides 200, 202 are formed from metal while the main body 102 is formed from plastic. In one implementation, the main body 102 is a molded plastic that is molded around the first and second drill bit guides 200, 202 to secure them to the main body 102.

In addition to forming the cups in the cabinet door 160, the illustrated jig 100 includes an optional cabinet hole template 220.

With principle reference to FIGS. 10-14, the cabinet hole template 220 includes a first portion 222 and a second portion 224. In the illustrated embodiment, the first and second portions 222, 224 extend at right angles to one another and are generally planar portions.

The cabinet hole template 220 includes a plurality of apertures used to mark the location of screw holes to be formed in the frame of the cabinet to which the cabinet door 160 is to be mounted. The apertures are typically provided as a pair of holes that have different spacing from the portion 222, 224 in which the holes are formed. For example, holes 230 of a first pair of holes have different spacing from second portion 224 than the holes 232 of a second pair of holes. Notably, holes 230 and 232 are both formed in a the same first portion 222 of cabinet hole template 220. Also, the holes within a single pair of holes can have different spacing than the holes within a different pair of holes. This is again illustrated by the pair of holes 230 having a different spacing between each other than the spacing between holes 232, which form a second pair of holes.

While holes 232 are spaced differently from the second portion 224 and have different hole-to-hole spacing as holes 230, some sets of holes may have one type of spacing the same but other spacing different. For example, all of the pairs of holes of which there are three in the second portion 224 have the same spacing from first portion 222 but different hole-to-hole spacing. Similarly, holes 234 have the same hole-to-hole spacing as holes 230 but have different spacing from second portion 224.

In use, a corner of a portion of a frame of a cabinet would be received in the corner 240 formed between the inner faces of the first and second portions 222, 2224 such that one of the first and second portions 222, 224 rests against the face of the cabinet frame. The user would then select the desired hole spacings and mark the location of the corresponding screw holes that are to be formed in the cabinet frame. Alternatively, the user could drill directly through the holes in the cabinet hole template 220.

Figure 5:
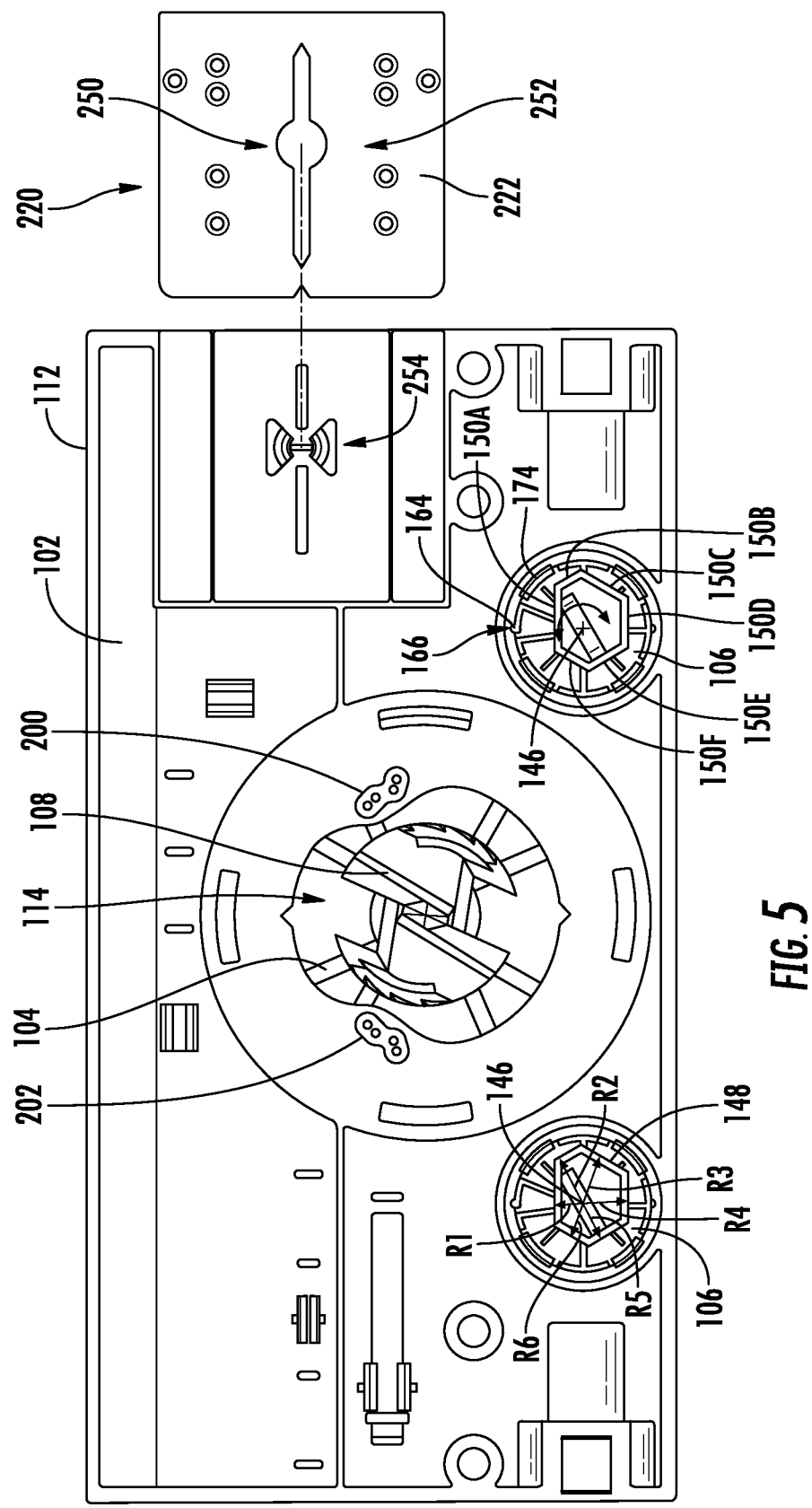
FIG. 5 is a partial exploded bottom view of the jig of FIG. 1 with the cabinet hole template removed from the main body of the jig.

With reference to FIGS. 2 and 5, the cabinet hole template 220 preferably mounts to the main body 102. In the illustrated embodiment, a snap engagement is provided between the components. In the illustrated embodiment, the first portion 222 includes a centrally located elongated slot 250 that includes a central mounting region 252. The central mounting region 252 engages a resilient post 254 formed from a plurality of post segments. The post segments flex inward when the cabinet hole template 220 is mounted to the main body 102 by pressing the post through central mounting region 252.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A jig for drilling a cup hole in a cabinet door to be mounted to a cabinet frame with a hinge, the jig comprising:
    a main body having a top surface, a bottom surface, and a drilling aperture extending therethrough, the drilling aperture being bounded by a sidewall extending between the top and bottom surfaces;
    a central drill bit guide removably attachable to the main body over the drilling aperture, the central drill bit guide having a drill bit hole for receiving and guiding a shank of a drill bit;
    a pair of alignment cams, each alignment cam of the pair of alignment cams being rotatably mounted to the main body for rotation about a central axis, each alignment cam having a plurality of cam regions having different radial spacings from the central axis to adjust the position of the drilling aperture from a side of the cabinet door when the different cam regions abut an edge of the cabinet door; and
    a cabinet hole template having a first portion and a second portion extending perpendicular to the first portion, the cabinet hole template having at least a first pair of holes formed therethrough for forming holes in the cabinet frame, the cabinet hole template and the main body having a snap engagement interface for releasably securing the cabinet hole template to the main body.

2. The jig of claim 1, wherein the snap engagement interface includes an aperture formed by one of the main body and the cabinet hole template and a resilient post sized larger than the aperture, the resilient post being formed by the other one of the main body and the cabinet hole template.

3. The jig of claim 1, wherein the cabinet hole template includes a second pair of holes, the first pair of holes being formed in the first portion and the second pair of holes being formed in the second portion.

4. The jig of claim 3, wherein each hole of the first pair of holes is spaced a same first distance from the second portion and each hole of the second pair of holes is spaced a same second distance from the first portion, the second distance being different than the first distance.

5. The jig of claim 4, wherein the cabinet hole template includes a third pair of holes, the third pair of holes being formed in the second portion, each hole of the third pair of holes is spaced the same second distance from the first portion, the second pair of holes being spaced a third distance from one another, the third pair of holes being spaced a fourth distance from one another, the third and fourth distances being different.

6. The jig of claim 5, wherein:
the cabinet hole template includes a fourth pair of holes, the fourth pair of holes being formed in the first portion, each hole of the fourth pair of holes is spaced a fifth distance from the second portion, the fifth distance being greater than the first distance; and
the first pair of holes being spaced a sixth distance from one another, the fourth pair of holes being spaced the sixth distance from one another.

7. A jig for drilling a cup hole in a cabinet door comprising:
    a main body having a top surface, a bottom surface, and a drilling aperture extending therethrough, the drilling aperture being bounded by a sidewall extending between the top and bottom surfaces;
    a central drill bit guide removably attachable to the main body over the drilling aperture, the central drill bit guide having a drill bit hole for receiving and guiding a shank of a drill bit; and
    a pair of alignment cams, each alignment cam of the pair of alignment cams being rotatably mounted to the main body for rotation about a central axis, each alignment cam having a plurality of cam regions having different radial spacings from the central axis to adjust the position of the drilling aperture from a side of the cabinet door when the different cam regions abut an edge of the cabinet door;
    a drill bit having a shaft slidably and rotatably mountable within the drill bit hole;
    a stop collar adjustably attachable along the shaft of the drill bit;
    a first stop collar alignment channel formed in the main body having a first portion sized to receive an end portion of the shaft and a second portion sized to receive the stop collar to position the stop collar at a first position along the shaft from an end of the shaft defined by the end portion; and
    a second stop collar alignment channel formed in the main body having a first portion sized to receive an end portion of the shaft and a second portion sized to receive the stop collar to position the stop collar at a second position along the shaft from the end of the shaft.

8. The jig of claim 7, wherein:
the first stop collar alignment channel includes a first abutment against which the end of the shaft abuts when the stop collar is attached thereto, the second portion of the first stop collar alignment channel is spaced the first distance from the first abutment;
the second stop collar alignment channel includes a second abutment against which the end of the shaft abuts when the stop collar is attached thereto, the second portion of the second stop collar alignment channel is spaced the second distance from the second abutment.

9. The jig of claim 8, wherein:
the first portion of the first and second stop collar alignment channels has a curved bottom that has a first radius of curvature;
the second portion of the first and second stop collar alignment channel has a second radius of curvature that is greater than the first radius of curvature;
the first portions being radially offset from the second portions to form a radial step between the first portions and the second portions, the steps forming an abutment for locating the stop collar relative to the first and second abutments.

* * * * *